(12) United States Patent
Kato

(10) Patent No.: US 7,890,672 B2
(45) Date of Patent: Feb. 15, 2011

(54) DATA PROCESSING APPARATUS AND DATA TRANSFER METHOD

(75) Inventor: Tetsuya Kato, Shizuoka (JP)

(73) Assignee: NEC Access Technica, Ltd., Shizuoka (JP)

( * ) Notice: Subject to any disclaimer, the term of this patent is extended or adjusted under 35 U.S.C. 154(b) by 257 days.

(21) Appl. No.: 12/174,710

(22) Filed: Jul. 17, 2008

(65) Prior Publication Data

US 2009/0031054 A1 Jan. 29, 2009

(30) Foreign Application Priority Data

Jul. 26, 2007 (JP) .............................. 2007-194028

(51) Int. Cl.
*G06F 13/28* (2006.01)
*G06F 15/16* (2006.01)

(52) U.S. Cl. ............................. 710/22; 710/36; 710/52; 710/65; 709/250

(58) Field of Classification Search ............... 710/22–28
See application file for complete search history.

(56) References Cited

U.S. PATENT DOCUMENTS

| 5,933,654 | A * | 8/1999 | Galdun et al. ................. 710/23 |
| 6,731,644 | B1 * | 5/2004 | Epps et al. .................. 370/412 |
| 2009/0031054 | A1 * | 1/2009 | Kato ........................... 710/22 |

FOREIGN PATENT DOCUMENTS

| EP | 1006451 | A  |   | 6/2000 |
| EP | 1006451 | A1 | * | 6/2000 |
| JP | 7-273801 | A |   | 10/1995 |
| JP | 2001511575 | A |   | 8/2001 |
| JP | 2001325212 | A |   | 11/2001 |
| JP | 2005033296 | A |   | 2/2005 |

OTHER PUBLICATIONS

European Search Report for EP Application No. 08075666.1, search completed Nov. 17, 2008.
Japanese Office Action for JP2007-194028 issued Jan. 15, 2009.
Japanese Office Action for JP2007-194028 issued on May 28, 2009.

* cited by examiner

*Primary Examiner*—Christopher B Shin

(57) ABSTRACT

A data processing apparatus which can copy necessary data without imposing a burden on a CPU when broadcasting specific data is realized. A data processing apparatus includes a reception FIFO memory which temporarily stores received data sequentially; a buffer management unit which reads out the received data stored in the reception FIFO memory, discriminates whether or not a plurality of the same data are required for transferring the received data, and searches a plurality of buffer memory areas that are different from each other when the plurality of the same data are required; and a DMA (Direct Memory Access) control circuit which writes the received data read from the reception FIFO memory into each of buffer memory areas designated by the buffer management unit.

7 Claims, 12 Drawing Sheets

DATA PROCESSING APPARATUS AND DATA TRANSFER METHOD

INCORPORATION BY REFERENCE

This application is based upon and claims the benefit of priority from Japanese Patent Application No. 2007-194028 filed on Jul. 26, 2007, the disclosure of which is incorporated herein in its entirety by reference.

TECHNICAL FIELD

The present invention relates to a data processing apparatus which copies the same data as required and a data transfer method for copying received data and transferring the copied data, and in particular, relates to the data processing apparatus and the data transfer method suitable for broadcasting the data or multicasting the same.

BACKGROUND ART

A data communication speed (or a data transmission rate) of the Ethernet (registered trademark) is improved year by year, and mainstream thereof is shifting from 100 Mbps (megabit per second) to 1 Gbps (gigabit per second). A router is required to speed up a routing process than ever before. One approach to conform to the requirement is to increase a clock frequency for a CPU (Central Processing Unit) which performs a control and data processing in the router. When a clock frequency is increased, processing capacity of the CPU per unit time is improved, and as a result, capacity of the routing process is improved.

However, when the CPU operating with a high clock frequency is used, apparatus cost including the CPU becomes high. Additionally, power consumption of the apparatus becomes larger. Other than the router mentioned above, there is a multicast communication apparatus, for example, as the data processing apparatus which copies specific data as required and produces a plurality of sets of data. Usually, the data processing apparatus, such as the multicast communication apparatus or the router is used in user's premises. Therefore, such apparatuses are required to be low in price and low in power consumption. Accordingly, since the clock frequency for the CPU cannot be simply increased in the data processing apparatus, other countermeasures for improving processing capacity not relying on increasing the clock frequency are required.

Japanese Patent Application Laid-Open No. 2005-033296 discloses the multicast communication apparatus which copies user data with involvement of a CPU and performs communication by adding a header part including respective port numbers of multicast destinations to each of the user data.

SUMMARY

An exemplary object of the present invention is to provide a data processing apparatus which can copy necessary data without imposing a burden on a CPU when broadcasting or multicasting specific data. Additionally, another object of the present invention is to provide a data transfer method which can copy the received data as required and can transfer the copied data without imposing a burden on the CPU.

A data processing apparatus according to an exemplary aspect of the invention includes a reception FIFO memory which temporarily stores received data sequentially; a buffer management unit which reads out the received data stored in the reception FIFO memory, discriminates whether or not a plurality of the same data are required for transferring the received data, and searches a plurality of buffer memory areas that are different from each other when the plurality of the same data are required; and a DMA (Direct Memory Access) control circuit which writes the received data read from the reception FIFO memory into each of buffer memory areas designated by the buffer management unit.

A data transfer method according to an exemplary aspect of the invention includes discriminating whether or not a plurality of the same data are required for transferring received data in different transmission data format; designating storage locations different from each other for storing the same data of the received data when the plurality of the same data are required for transferring the received data in the different transmission data format; performing DMA (Direct Memory Access) transfer for writing the received data into each of the storage locations; formatting each of the received data stored in the storage locations into the different transmission data format for generating transmission data; and transmitting the transmission data having the different transmission data format.

According to the present invention, because a required copy of data is obtained at each data storage location by performing DMA (Direct Memory Access) transfer of data to a plurality of data storage locations, a CPU is not involved in the process. Accordingly, processing capacity of the CPU can be used for other processes and efficiency of data processing can be improved.

BRIEF DESCRIPTION OF THE DRAWINGS

Exemplary features and advantages of the present invention will become apparent from the following detailed description when taken with the accompanying drawings in which.

EXEMPLARY EMBODIMENT

An exemplary embodiment of the present invention will now be described in detail in accordance with the accompanying drawings.

Figure 1:
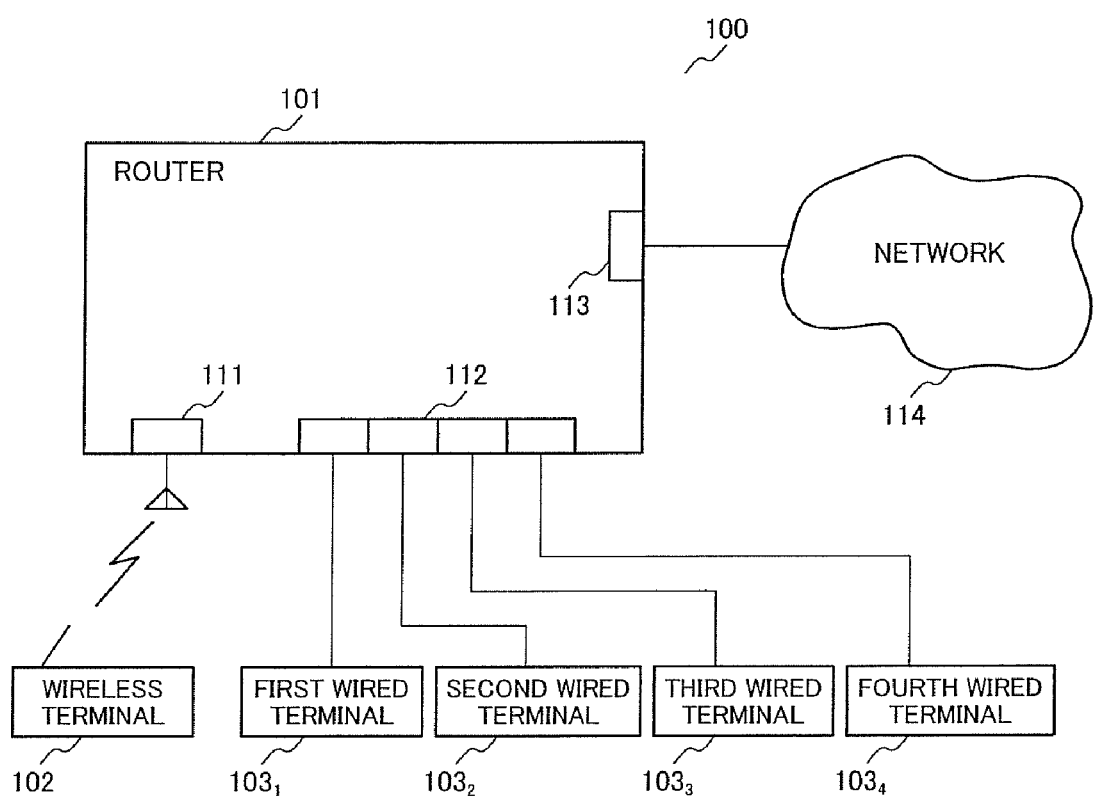
FIG. 1 is a system configuration diagram showing a communication system of an exemplary embodiment of the present invention.

FIG. 1 is a system configuration diagram showing a communication system of the exemplary embodiment of the present invention. In a data processing system 100, a router 101 having a function of copying received data connects with a wireless terminal 102 which performs communication via a wireless LAN (Local Area Network) interface 111, first to fourth wired terminals $103_1$ to $103_4$ which perform communication via a wired LAN interface 112, and a network 114 such as the Internet via a WAN (Wide Area Network) interface 113 that is composed of telephone lines or dedicated lines.

Figure 2:
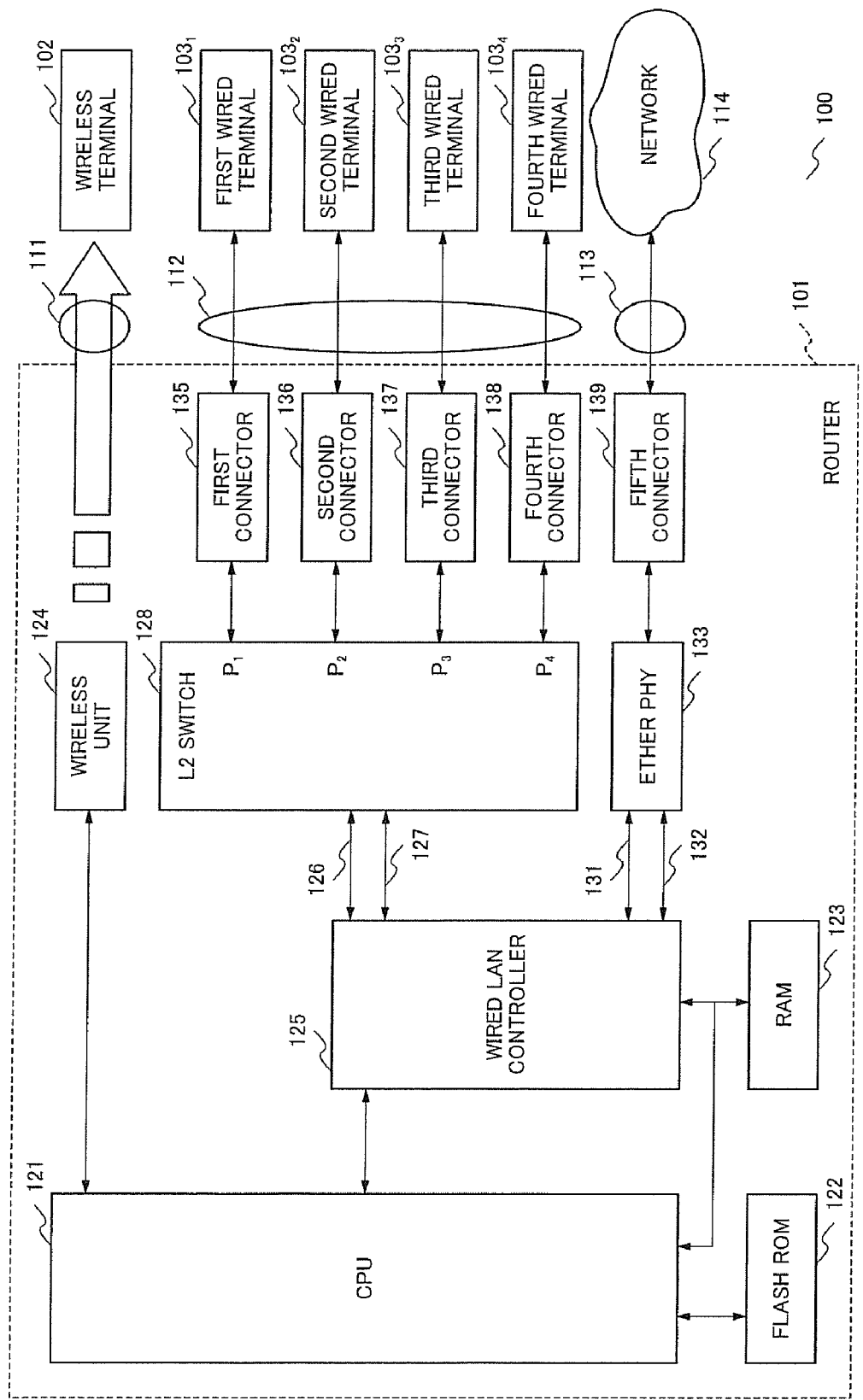
FIG. 2 is a block configuration diagram showing a configuration of a router of the exemplary embodiment of the present invention.

FIG. 2 is a block configuration diagram showing a configuration of the router 101 of the exemplary embodiment of the present invention.

The router 101 includes a CPU (Central Processing Unit) 121 which controls each part of the router. The CPU 121 connects with a non-volatile flash ROM (flash Read Only Memory) 122 storing control programs thereof and a RAM (Random Access Memory) 123 storing various data such as working data and communication data. Each program stored in the flash ROM 122 is read out and stored in the RAM 123 appropriately. The CPU 121 also connects with a wireless unit 124 and a wired LAN controller 125. The CPU 121 and the wireless unit 124 are connected by, for example, a PCI (Peripheral Components Interconnect) bus.

The wireless unit 124 is an equipment which performs wireless communication conforming to IEEE (Institute of Electrical and Electronic Engineers) 802.11 with the wireless terminal 102. The wired LAN controller 125 is a controller for the Ethernet (registered trademark). The wired LAN controller 125 connects with a control side of an L2 (layer 2) switch 128 via an MII (Media Independent Interface) 126 and an MDIO (Management Data Input/Output) 127. The MII 126 is an interface with a MAC (Media Access Control) layer and a physical layer, and the MDIO 127 is a bus structure defined by the Ethernet (registered trademark) protocol. The wired LAN controller 125 connects with a control side of Ether PHY (Fast Ethernet (registered trademark) Physical Layer Transceiver) 133 via the MII 131 and the MDIO 132. The Ether PHY connects with the network 114 by the Ethernet (registered trademark).

The L2 switch 128 switches a destination of a packet according to a learned MAC address. The L2 switch 128 includes a first port to a fourth port $P_1$ to $P_4$. The first port $P_1$ connects with the first wired terminal $103_1$ via a first connector 135 and the wired LAN interface 112. The second port $P_2$ connects with the second wired terminal $103_2$ via a second connector 136 and the wired LAN interface 112. The third port $P_3$ connects with the third wired terminal $103_3$ via a third connector 137 and the wired LAN interface 112. The fourth port $P_4$ connects with the fourth wired terminal $103_4$ via a fourth connector 138 and the wired LAN interface 112. The Ether PHY 133 connects with the network 114 via a fifth connector 139 and the WAN interface 113.

A routing process performed by the router 101 in the data processing system 100 which is configured as mentioned above is described below. For example, the router 101 routes data received by the WAN interface 113 to the wireless LAN (Local Area Network) interface 111 and the wired LAN interface 112.

Figure 3:
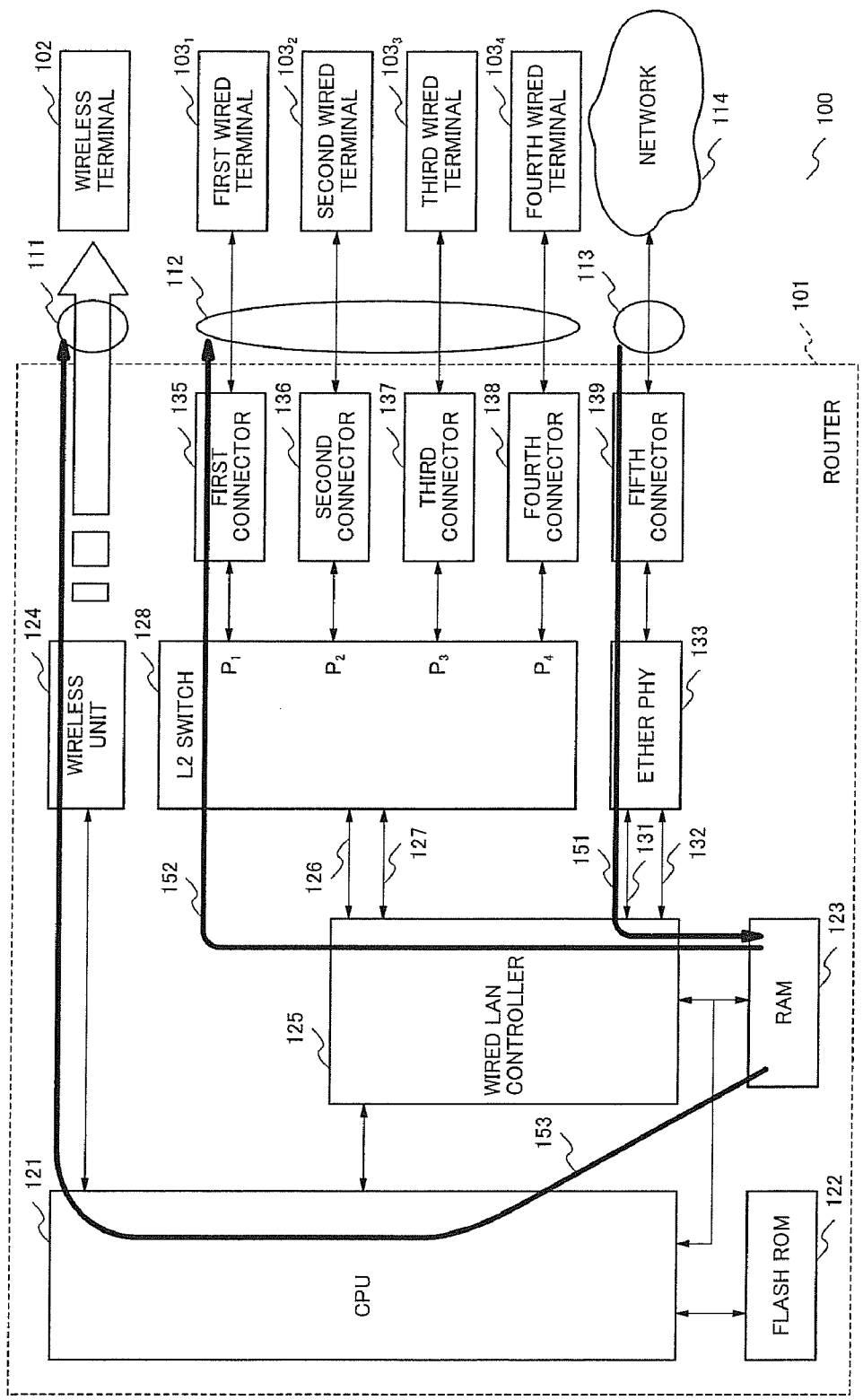
FIG. 3 is an explanatory figure illustrating a communication system in which data is transferred from a WAN to a LAN in the exemplary embodiment of the present invention.

FIG. 3 is a figure illustrating a process in which data is transferred from a WAN to a LAN. The data, received by the router 101 from the WAN interface 113 via the fifth connector 139, first reaches the Ether PHY 133 as shown by an arrow 151. After that, the data reaches the wired LAN controller 125 via the MII 131. The wired LAN controller 125 includes a DMA (Direct Memory Access) circuit (not shown), and the received data is stored in the RAM 123 via the DMA circuit. That is, the received data can be stored in the RAM 123 without control of the CPU 121. After this, information about the data stored in the RAM 123 is written in an area called as a reception descriptor. The information to be written in the reception descriptor includes information about a data reception status (the information indicating whether or not data reception in the router 101 is completed), an address of a received data buffer in which the received data is stored, and a length of the received data. The reception descriptor may be configured in an area in the RAM 123 or configured as a register group (not shown) in the wired LAN controller 125. Also, both of the area in the RAM 123 and the register group in the wired LAN controller 125 can be used together.

Figure 4:
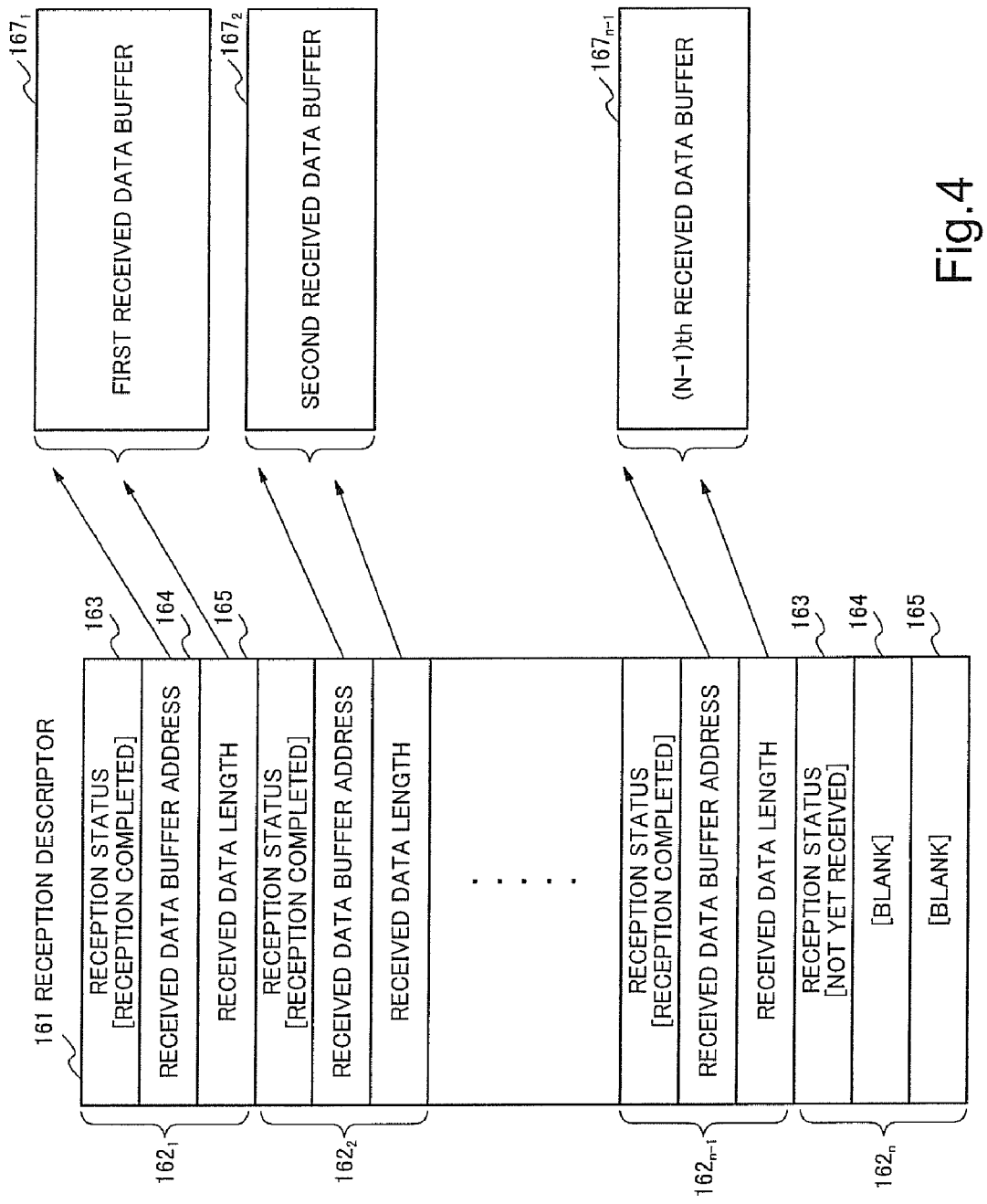
FIG. 4 is an explanatory drawing showing a reception descriptor and received data buffers of the exemplary embodiment of the present invention.

FIG. 4 is an explanatory drawing showing a relation between the reception descriptor and the received data buffers. A reception descriptor 161 includes first to nth element area $162_1$ to $162_n$. Further, a value "n" is an integer that is equal to or more than 2. In each element area, information about the intended received data is stored. In other words, a reception status 163 which indicates whether or not reception is completed, a received data buffer address 164 which indicates a start address of the buffer area for the received data and a received data length 165 which indicates a size of the buffer area are stored. In an example shown in FIG. 4, the first to the (n−1)th element area $162_1$ to $162_{n-1}$ includes information for the received data, respectively. A reception status indicated in each element area is "reception completed". In the nth element area $162_n$, the reception status is "not yet received", and the information for the received data is not stored (blank).

A first to an (n−1)th received data buffer $167_1$ to $167_{n-1}$ which are determined by the received data buffer address 164 and the received data length 165 are allocated in the RAM 123 (FIG. 2), and the respective received data are stored therein. In an example shown in FIG. 4, since the reception status 163 of the nth received data buffer $167_n$ is "not yet received", a corresponding received data does not exist and the nth received data buffer $167_n$ is not allocated in the RAM 123.

The respective received data stored in the first to the (n−1)th received data buffer $167_1$ to $167_{n-1}$ are routed by the CPU 121 (FIG. 2). Specifically, for example, a protocol header of the received data such as a MAC address, a VLAN tag, IP and TCP/UDP is compared with a value stored in a routing table and each destination thereof is determined.

For example, when the destination of the data received by the router 101 is the wired LAN interface 112 (FIG. 2), the CPU 121 converts the received data into a suitable format for LAN data to be transmitted to the wired LAN interface 112. The converted LAN data is written into a predetermined transmission buffer by the CPU 121. Here, the data to be transmitted to the wired LAN interface 112 is transmitted by using packets conforming to IEEE802.11.

Figure 5:
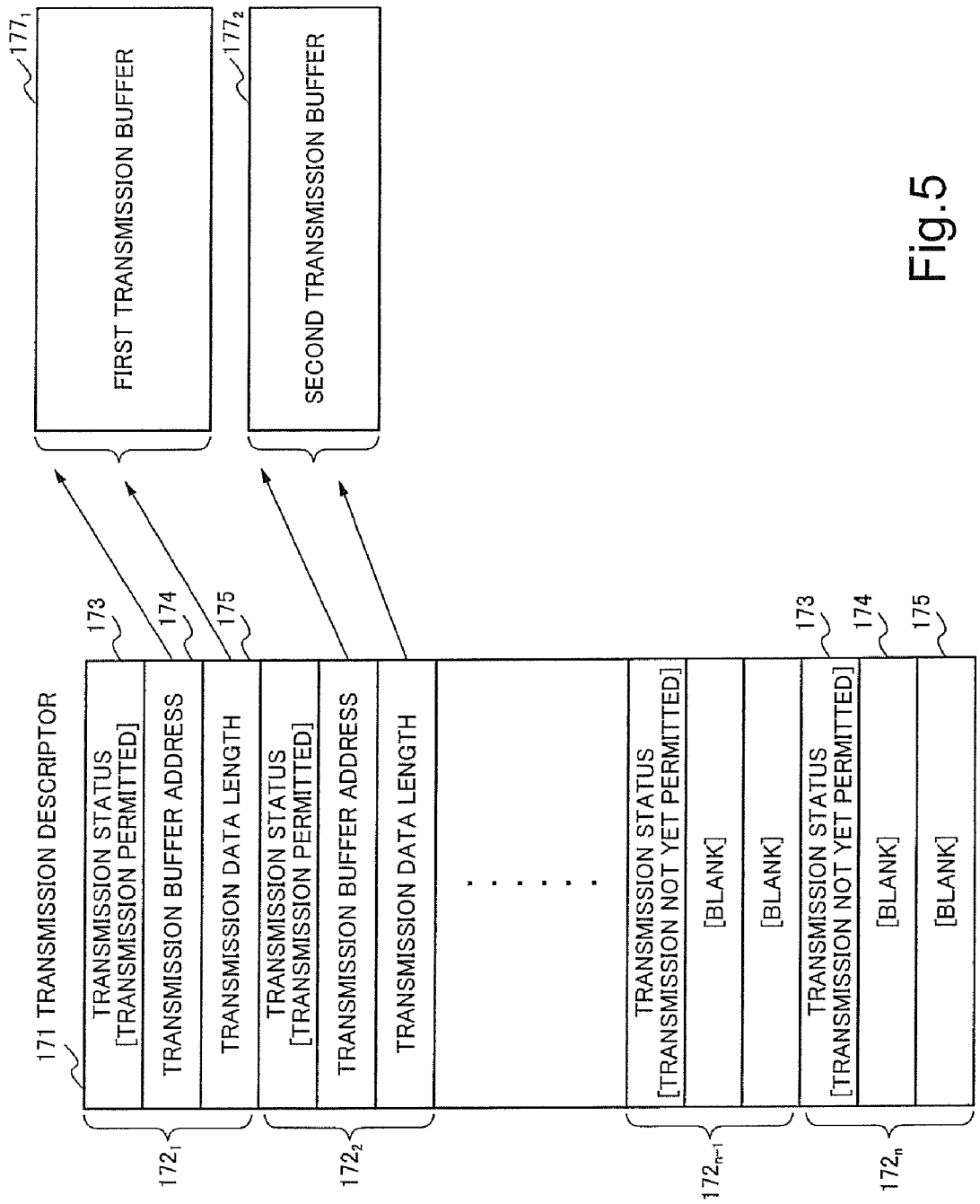
FIG. 5 is an explanatory drawing showing a transmission descriptor and transmission buffers of the exemplary embodiment of the present invention.

FIG. 5 is an explanatory drawing showing a relation between a transmission descriptor and transmission buffers. The transmission descriptor 171 includes first to nth element area $172_1$ to $172_n$. In each element area, information about the intended transmission data corresponding to each element area is stored. In other words, a transmission status 173 which indicates whether or not transmission is permitted, a transmission buffer address 174 which indicates a start address of the buffer area for the transmission data and a transmission data length 175 which indicates a size of the buffer area are stored. In an example shown in FIG. 5, at least the first element area $172_1$ and the second element area $172_2$ include information on the transmission data, respectively. The transmission status indicated in each element area is "transmission permitted". With respect to at least the (n−1)th element area $172_{n-1}$ and the nth element area $172_n$, the transmission status is "transmission not yet permitted", and information for transmission data is not stored (blank).

In an example shown in FIG. 5, at least the first and the second transmission buffers $177_1$ and $177_2$ which are determined by the transmission buffer address 174 and the transmission data length 175 are allocated in the RAM 123 (FIG. 2) and the respective transmission data are stored therein. In an example shown in FIG. 5, the transmission status 173 of each of the (n−1)th and the nth element areas is "transmission not yet permitted". Accordingly, corresponding transmission data does not exist and corresponding transmission buffers are not allocated in the RAM 123.

The wired LAN controller 125 (FIG. 2) checks the transmission descriptor 171 and judges whether or not the status of the transmission status 173 is "transmission permitted". When the status is "transmission permitted", the corresponding transmission data is read-out from the Xth transmission buffer $177_X$ based on the transmission buffer address 174 and the transmission data length 175 of the element area $172_X$ ("X" is a relevant arbitrary integer from 1 to n). As shown by an arrow 152 in FIG. 3, the transmission data is transmitted to the wired LAN interface 112.

In contrast, as a result of the routing process performed by the CPU 121, if the destination of the received data stored in the RAM 123 is the wireless LAN interface 111, the received data is directly transmitted from the CPU 121 as shown by an arrow 153 in FIG. 3. The CPU 121 converts the received data into a data format for wireless LAN in order to transmit the received data to the wireless LAN interface 111. The converted data for wireless LAN is transmitted to the wireless unit 124. Here, the data for wireless LAN is transmitted to the wireless LAN interface 111 by using packets conforming to the DIXII specification of the Ethernet (registered trademark) or IEEE802.3.

By the way, when the router 101 receives unicast data having a single destination address from the WAN interface 113, the unicast data is to be transmitted to only one destination. Accordingly, in this case, the unicast data is formatted into a data format corresponding to the destination that is either the wireless LAN interface 111 or the wired LAN interface 112, and the formatted data is transmitted.

In contrast, the router 101 may receive broadcast data or multicast data having plural destination addresses from the WAN interface 113. Streaming data being delivered from a content server (not shown) in the network 114 by using IP multicast is an example of such case. When the broadcast data or the multicast data is received, the received data has to be transferred to both of the wireless LAN interface 111 and the wired LAN interface 112 in accordance with the plural destination addresses.

When the data is transferred to both of the wireless LAN interface 111 and the wired LAN interface 112 simultaneously, two kinds of data whose protocols are different from each other have to be generated from one received data.

Accordingly, in a router of related art, a CPU has to copy the received data before performing a conversion process, and after that, the conversion of the respective data is performed, and then, a routing process is performed. In order to understand the present invention clearly, first, the router of related art will be described as a purpose of comparison.

Figure 11:
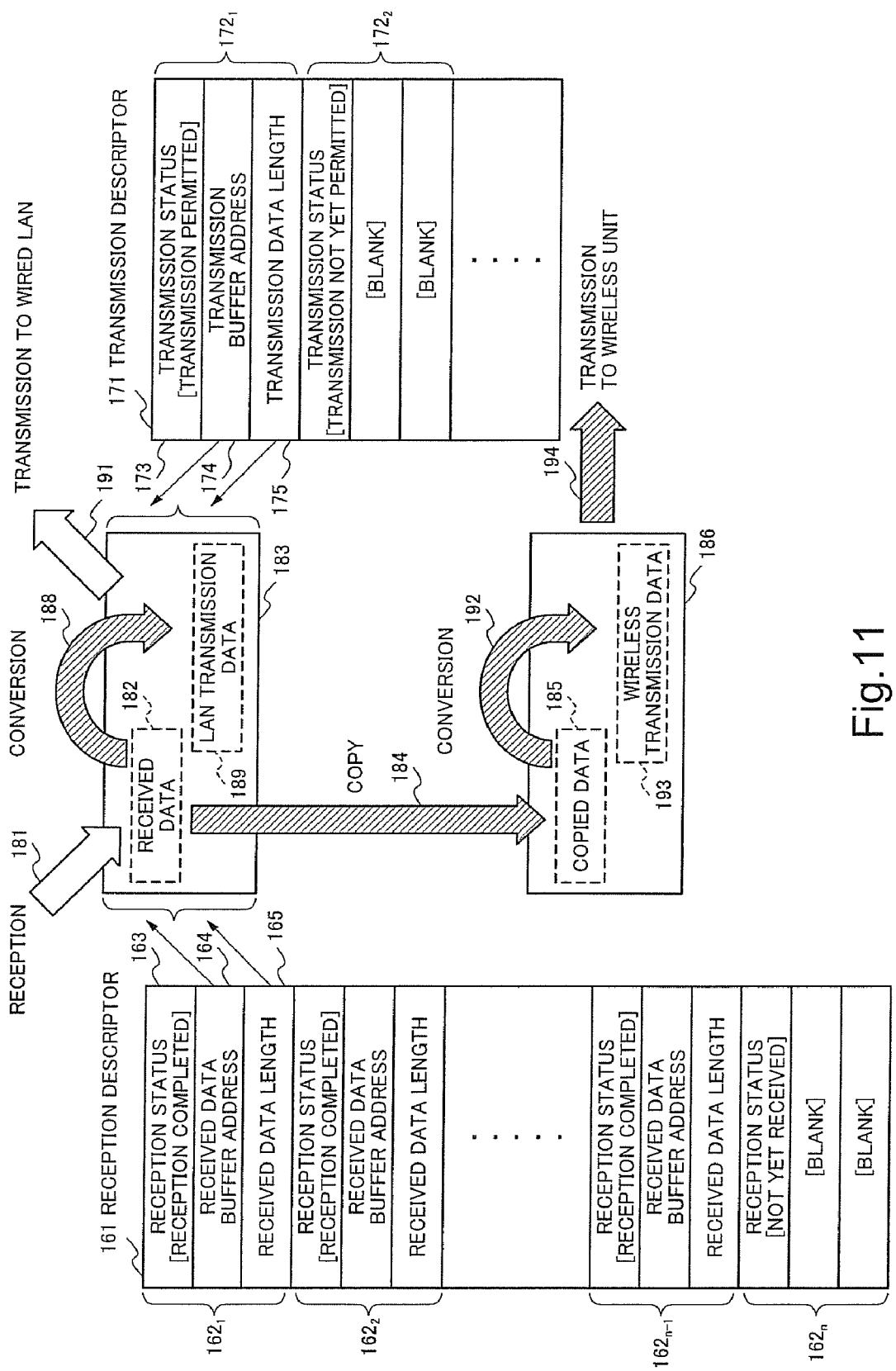
FIG. 11 is an explanatory drawing showing a process of related art which transmits data to both of a wireless LAN and a wired LAN.
Figure 12:
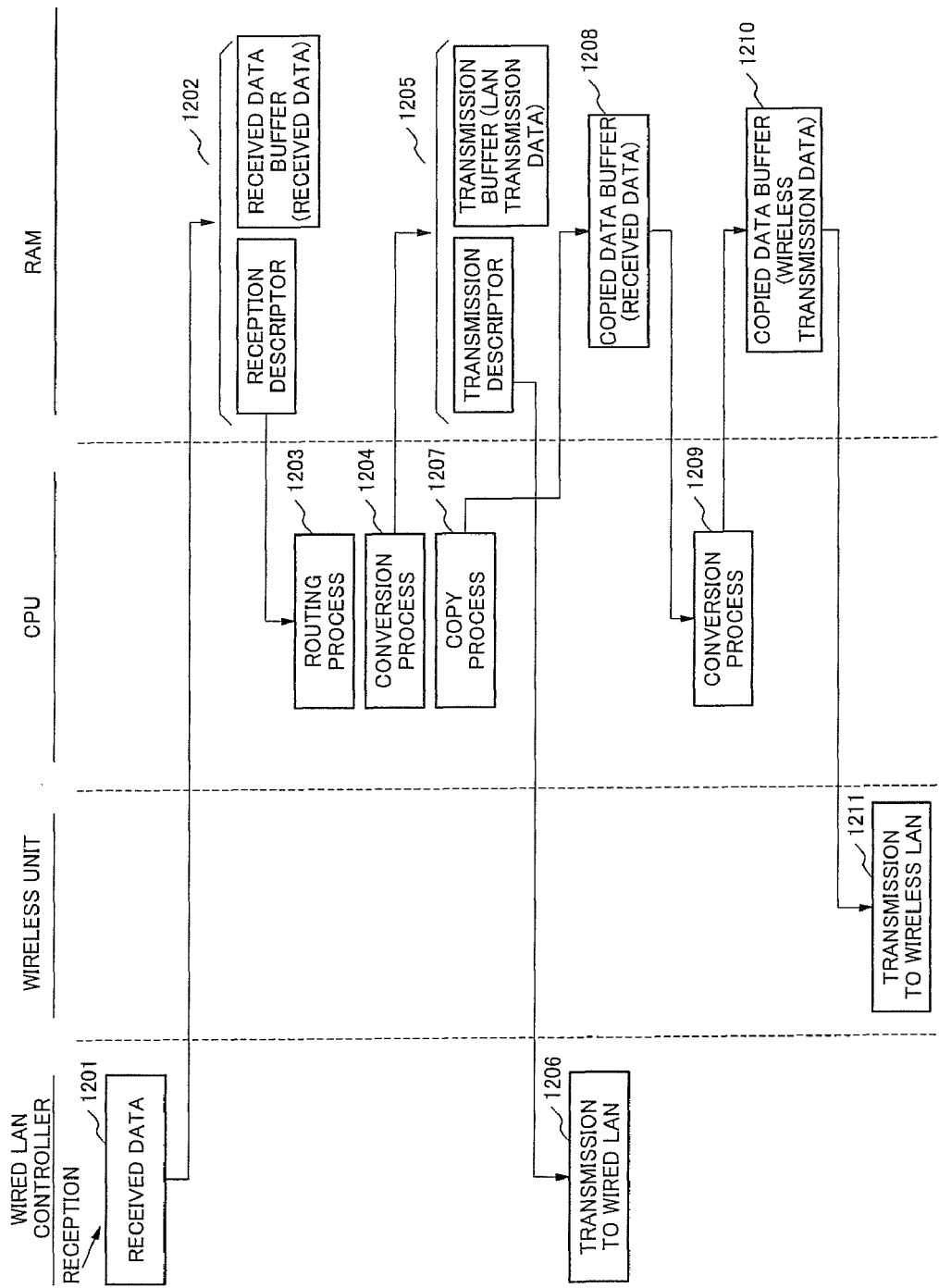
FIG. 12 is a sequence diagram illustrating a process of received data performed by a router of related art.

FIG. 11 is an explanatory drawing showing a principle of transmitting data to both of the wireless LAN and the wired LAN in the router of related art. FIG. 12 is a sequence diagram illustrating a process for received data performed by the router of related art. The received data 182 shown in FIG. 11 is data received by the router of related art which has performed a reception process 181, and the data is stored in a first buffer 183. A storage area of the received data 182 can be determined by referring to the received data buffer address 164 and the received data length 165 written in the reception descriptor 161, as described in descriptions on FIG. 4. In order to generate the data to be transmitted to the wireless LAN, the CPU performs a copying process 184 of the received data 182 to obtain copied data 185. The copied data 185 is stored in a second buffer 186.

On the other hand, with reference to FIG. 12, the received data is received by the wired LAN controller (Step 1201), and stored in the received data buffer of the RAM (Step 1202). In FIG. 12, the reception descriptor which stores information on the received data buffer is also provided in the RAM.

In FIG. 11, in order to transmit the received data 182 stored in the first buffer 183 to the wired LAN interface 112, the CPU performs a conversion process 188 to convert the received data 182 and generates the LAN transmission data 189. In order to transmit the LAN transmission data 189 having been generated, the information related to the generated data (the LAN transmission data 189) is set in the transmission descriptor 171. At that time, a storage location of the LAN transmission data 189 in the first buffer 183 is specified by the transmission buffer address 174 and the transmission data length 175 written in the transmission descriptor 171. Then, the LAN transmission data 189 stored in the first buffer 183 is transmitted to the wired LAN interface 112 by a transmission process 191 of the wired LAN controller.

In FIG. 12, the routing process is performed by the CPU based on destination addresses of the received data stored in the received data buffer of the RAM (Step 1203), and the LAN transmission data to be transmitted to the wired LAN interface 112 is generated by a conversion process (Step 1204). The LAN transmission data having been generated is stored in the transmission buffer and the information related thereto is set in the transmission descriptor. Both of the transmission buffer and the transmission descriptor are stored in the RAM (Step 1205). The LAN transmission data stored in the RAM is transmitted to the wired LAN interface by a transmission process performed by the wired LAN controller with referring to the transmission descriptor (Step 1206). From the result of the routing process having been performed in the step 1203, the CPU recognizes that the received data has also to be transmitted to the wireless LAN interface, and then, the CPU performs a copying process for copying the received data stored in the received data buffer (Step 1207), and stores the copied data in a copied data buffer provided in the RAM (Step 1208).

In FIG. 11, the CPU performs a conversion process 192 for a wireless LAN with respect to the copied data 185 in the second buffer 186, and generates a wireless transmission data 193. The wireless transmission data 193 after the conversion process 192 is transmitted to a wireless unit by a transmission process 194 performed by the CPU.

In FIG. 12, the CPU performs a conversion process of the received data stored in the copied data buffer (Step 1209) to convert the received data into the wireless transmission data (Step 1210) and transmits the wireless transmission data to a wireless LAN interface from the wireless unit (Step 1211).

In other words, in the related art, as shown in FIG. 11, the copying process 184, the conversion process 188 for generating data for the wired LAN, the conversion process 192 for generating data for the wireless LAN and the transmission process 194 for transmitting data to the wireless unit are performed in the CPU.

However, the copying process 184 highly consumes a processing power of the CPU, and the high power consumption causes processing capacity of the router to decrease in the related art. Accordingly, the router of the exemplary embodiment does not perform the copying process 184 described in FIG. 11 (Step 1207 in FIG. 12) and prevents the processing capacity of the CPU from being decreased.

The router 101 of the exemplary embodiment will be described in detail with reference to FIGS. 6 to 10.

Figure 6:
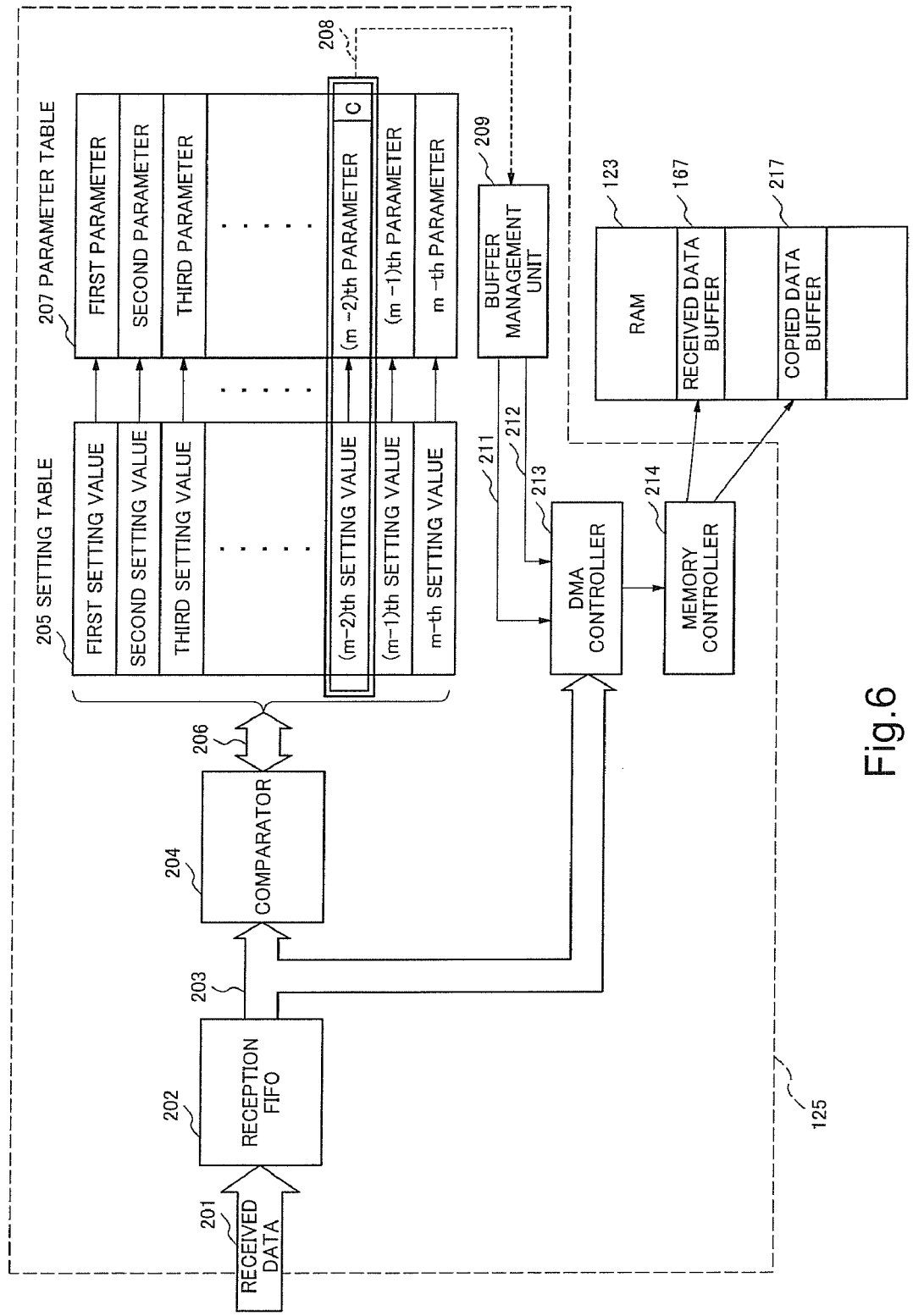
FIG. 6 is an explanatory drawing showing a process of received data performed by the router of the exemplary embodiment of the present invention.
Figure 7:
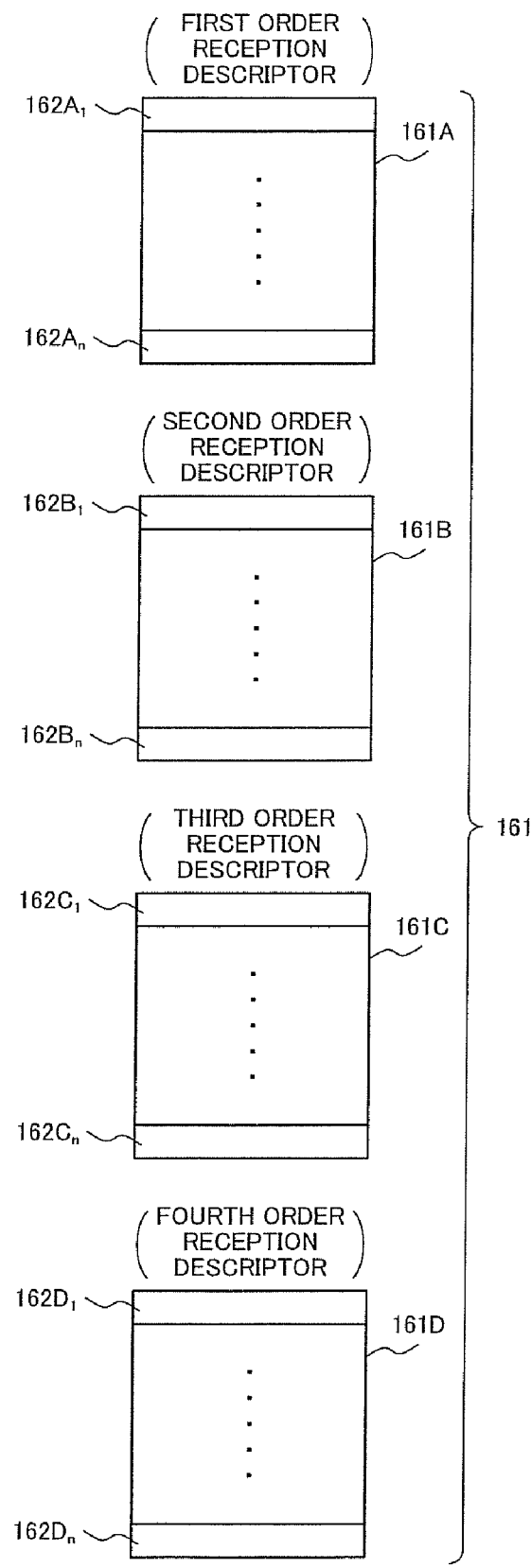
FIG. 7 is an explanatory drawing showing a configuration of the reception descriptor of the exemplary embodiment of the present invention.

FIG. 6 is an explanatory drawing showing principle of a process of the received data that is performed by the router of the exemplary embodiment. FIG. 7 is an explanatory drawing showing a configuration of the reception descriptor of the exemplary embodiment of the present invention.

The received data 201 shown in FIG. 6 is data which the router 101 has obtained from the network 114 via the WAN interface 113 and the fifth connector 139 (see also FIG. 3). The received data 201 is stored in a reception FIFO (First-In First-Out) memory 202 in the wired LAN controller 125. The reception FIFO memory 202 stores the received data 201 in order of reception, and the stored data is sequentially read out in order of storing. The received data 203 outputted from the reception FIFO memory 202 enters a comparator 204. Header information of the received data 203 is compared in series with each setting value in a setting table 205 by the comparator 204. The setting table 205 pre-stores the setting values for comparison such as a MAC header, an IP header and a TCP/UDP header. The setting table 205 includes m elements which ranges a first setting value to mth setting value.

A parameter table 207 corresponding to the setting table 205 is provided in the wired LAN controller 125. The parameter table 207 pre-stores parameters corresponding to the setting values which range the first setting value to the mth setting value, and the same numbered parameter in the parameter table 207 corresponds to the same numbered setting value in the setting table 205. Each parameter includes priority information about priority setting of the received data and a wireless transmission bit which indicates whether or not the data should be transmitted to the wireless unit 124.

As an example, it is assumed that header information of the received data 203 read from the reception FIFO memory 202 accords with the (m−2)th setting value 206 in the setting table 205. In this case, a parameter 208 which is the (m−2)th parameter corresponding to the (m−2)th setting value 206 is outputted from the parameter table 207. The outputted parameter 208 is sent to a buffer management unit 209. Here, "C" included in the (m−2)th parameter is the wireless transmission bit which indicates transmission to the wireless LAN is needed.

The buffer management unit 209 is an equipment block which manages the received data buffer 167 and the copied data buffer 217 in the RAM 123 according to contents of the priority information and the wireless transmission bit included in the parameter 208 obtained from the parameter table 207. The buffer management unit 209 searches a write address of the received data buffer 167 corresponding to priority by using the priority information included in the parameter 208 as a key data for address search. When the wireless transmission bit is set in the parameter 208, the buffer management unit 209 searches an available write address of the copied data buffer 217 in the RAM 123. Then, the buffer management unit 209 supplies a DMA controller 213 with the write address 211 of the received data buffer 167 and the write address (the copy address 212) of the copied data buffer 217.

Like this manner, the buffer management unit 209 discriminates whether or not a plurality of destinations are involved for transferring the received data in accordance with the parameter 208 extracted from the parameter table 207, and searches a plurality of buffer memory areas that are different from each other when a plurality of destinations for transferring said received data are involved. However, when the wireless transmission bit is not set in the parameter 208, as a matter of course, it is not necessary for the buffer management unit 209 to search the copy address 212 and only the write address 211 is supplied to the DMA controller 213.

FIG. 7 is an explanatory drawing showing a configuration of a reception descriptor of the exemplary embodiment of the present invention. In the exemplary embodiment, it is assumed that four priority levels are arranged. The reception descriptor 161 shown in FIG. 4 is classified into four priority levels in FIG. 7. In other words, the reception descriptor 161 is composed of a first order reception descriptor 161A having the highest priority, a second order reception descriptor 161B having second priority, a third order reception descriptor 161C having third priority and a fourth order reception descriptor 161D having the lowest priority. A first element area $162A_1$ to an nth element area $162A_n$ are provided for the first order reception descriptor 161A, and in a similar way, a first element area $162D_1$ to an nth element area $162D_n$ are provided for the fourth order reception descriptor 161D.

It is assumed that the header information of the received data 203 read from the reception FIFO memory 202 accords with the (m−2)th setting value 206, the priority information included in the parameter 208 which is the (m−2)th parameter corresponding to the (m−2)th setting value 206 is second order, and the wireless transmission bit is set.

First, the buffer management unit 209 searches an available write area of the received data buffer 167 in order to store the received data 203 in the RAM 123. Next, the buffer management unit 209 searches an available write area in the second order reception descriptor 161B. In other words, the buffer management unit 209 searches a vacant area in the received data buffer 167 and a vacant area in the second order reception descriptor 161B. In the second order reception descriptor 161B, the buffer management unit 209 designates the element area $162B_{X+1}$ as a writing area for the information about the received data. Here, the element area $162B_{X+1}$ is the succeeding element area of the element area $162B_X$ in which information has already been written, and "X" is an integer of 1 to n, and when X=n, X+1 becomes 1. (That is, when information is already written in the last element area $162B_n$ among the provided element areas, the first element area $162B_1$ is designated as the writing area.)

The buffer management unit 209 supplies the DMA controller 213 with the write address 211 which indicates the available write area of the received data buffer 167 and the available write area of the second order reception descriptor 161B, and additionally, supplies the DMA controller 213 with the copy address 212 when the wireless transmission bit is set.

Further, when the priority indicated by the parameter 208 is the first order, an address of an element in the first order reception descriptor 161A is designated. When the priority is the third order, an address of an element in the third order reception descriptor 161C is designated. When the priority is the fourth order, an address of an element in the fourth order reception descriptor 161D is designated. Then, required records on the corresponding element areas 162A, 162C or 162D are made.

The DMA controller 213 controls a memory controller 214 to write the received data 203 in the corresponding areas of the RAM 123 based on the address information provided from the buffer management unit 209.

That is, when the address of the element area $162B_{X+1}$ in the second order reception descriptor 161B and the write address of the received data 203 in the received data buffer 167 are designated as the write address 211, the DMA controller 213 writes the received data 203, which is being processed, in the address in the received data buffer 167, and writes the reception status 163, the received data buffer address 164 and the received data length 165 in the element area $162B_{X+1}$ of the second order reception descriptor 161B as described in FIG. 4. When the wireless transmission bit is set, since the copy address 212 is also designated, the DMA controller 213 also writes the received data 203 in the designated copy address 212 in the copied data buffer 217. The write control of the received data 203 is performed without involvement of the CPU 121.

When a writing process to the received data buffer 167 and the copied data buffer 217 is completed with respect to one received data 203 read from the reception FIFO memory 202, the process is performed for the second oldest received data 203 which is read from the reception FIFO memory 202 and the writing process for this received data is performed based on a similar way. Subsequent processes are performed similarly.

With respect to the received data buffer 167 in the RAM 123, a conversion process is performed by the CPU 121 and the LAN transmission data to be transmitted to the wired LAN interface 112 is generated. Information used for transmitting the generated LAN transmission data is set to the transmission descriptor 171 as described in FIG. 5.

At that time, the generated LAN transmission data corresponding to the received data that was read based on the first order reception descriptor 161A shown in FIG. 7 has the highest priority of transmission. The reception descriptors 161B, 161C and 161D each having different priority are processed according to the priority thereof.

The process according to the priority will be described with reference to FIGS. 8 and 9.

Figure 8:
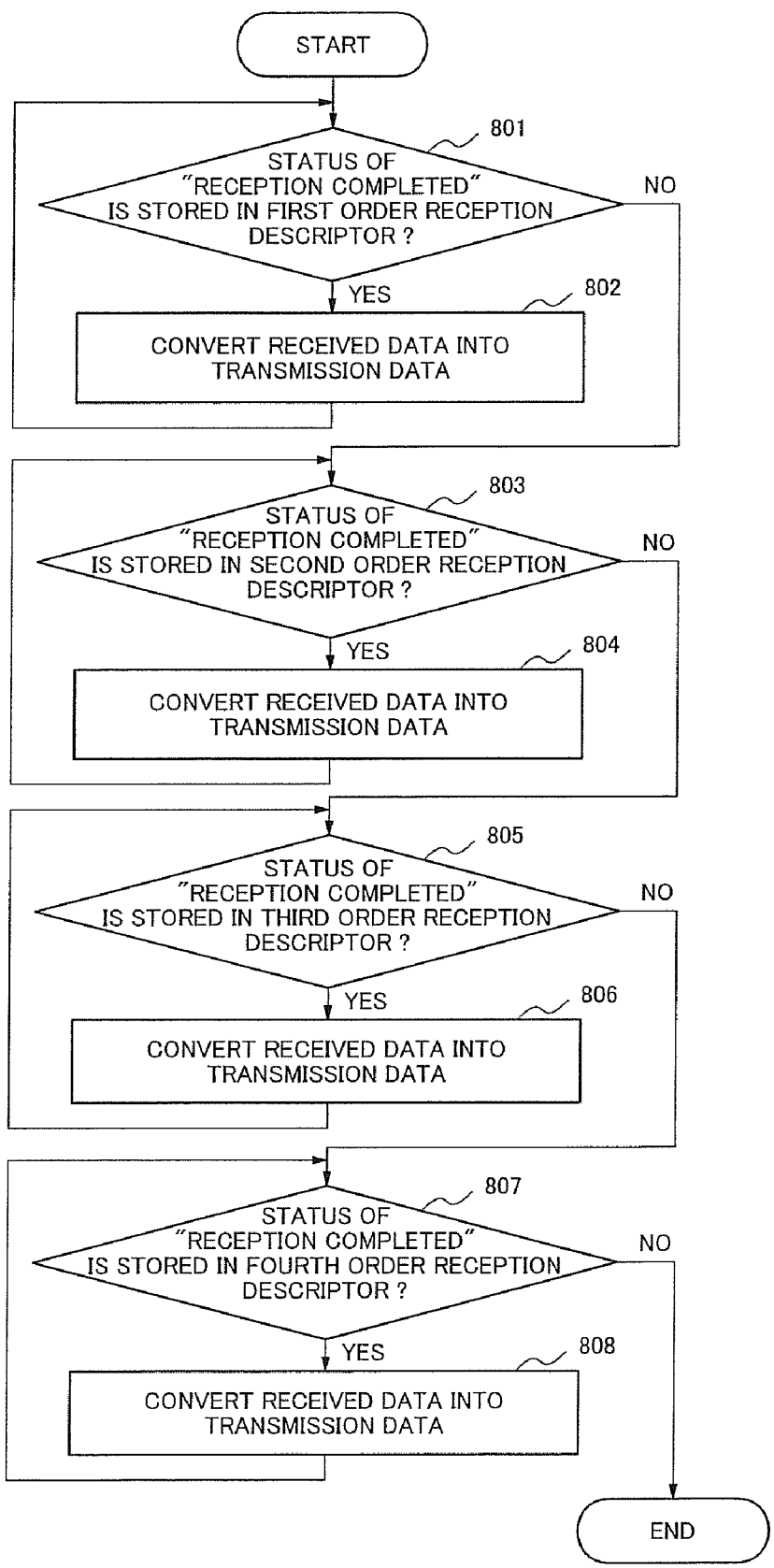
FIG. 8 is a flowchart illustrating priority processing of the received data by the router of the exemplary embodiment of the present invention.

FIG. 8 is a flowchart illustrating a priority processing of the received data by the router 101 of the exemplary embodiment of the present invention.

When converting the received data into transmission data, the CPU 121 accesses the received data buffer 167 with reference to the reception descriptor 161. If the process according to the priority is required, the CPU 121 performs a conversion process for converting the received data into the transmission data with respect to the received data buffer 167 corresponding to information stored in the reception descriptor 161 in order of higher priority. In other words, as shown in FIG. 8, in the first order reception descriptor 161A, the received data buffer information (i.e. the received data buffer address 164 and the received data length 165) with the reception status 163 of "reception completed" is searched for (Step 801). When the received data buffer information with the reception status 163 of "reception completed" is being stored in the first order reception descriptor 161A, the received data buffer 167 is accessed and the process for converting the received data into the transmission data is carried out (Step 802). When the process for one received data buffer information is completed, the process in step 801 is repeated and it is confirmed whether or not other received data buffer information with the reception status 163 of "reception completed" exists in the first order reception descriptor 161A. When it is confirmed by the process in step 801 that the received data buffer information with the reception status 163 of "reception completed" does not exist, the same process is performed in the second order reception descriptor 161B (steps 803 and 804). After that, similarly, the process is performed in the third order reception descriptor 161C and the fourth order reception descriptor 161D (steps 805 and 806, and steps 807 and 808).

Figure 9:
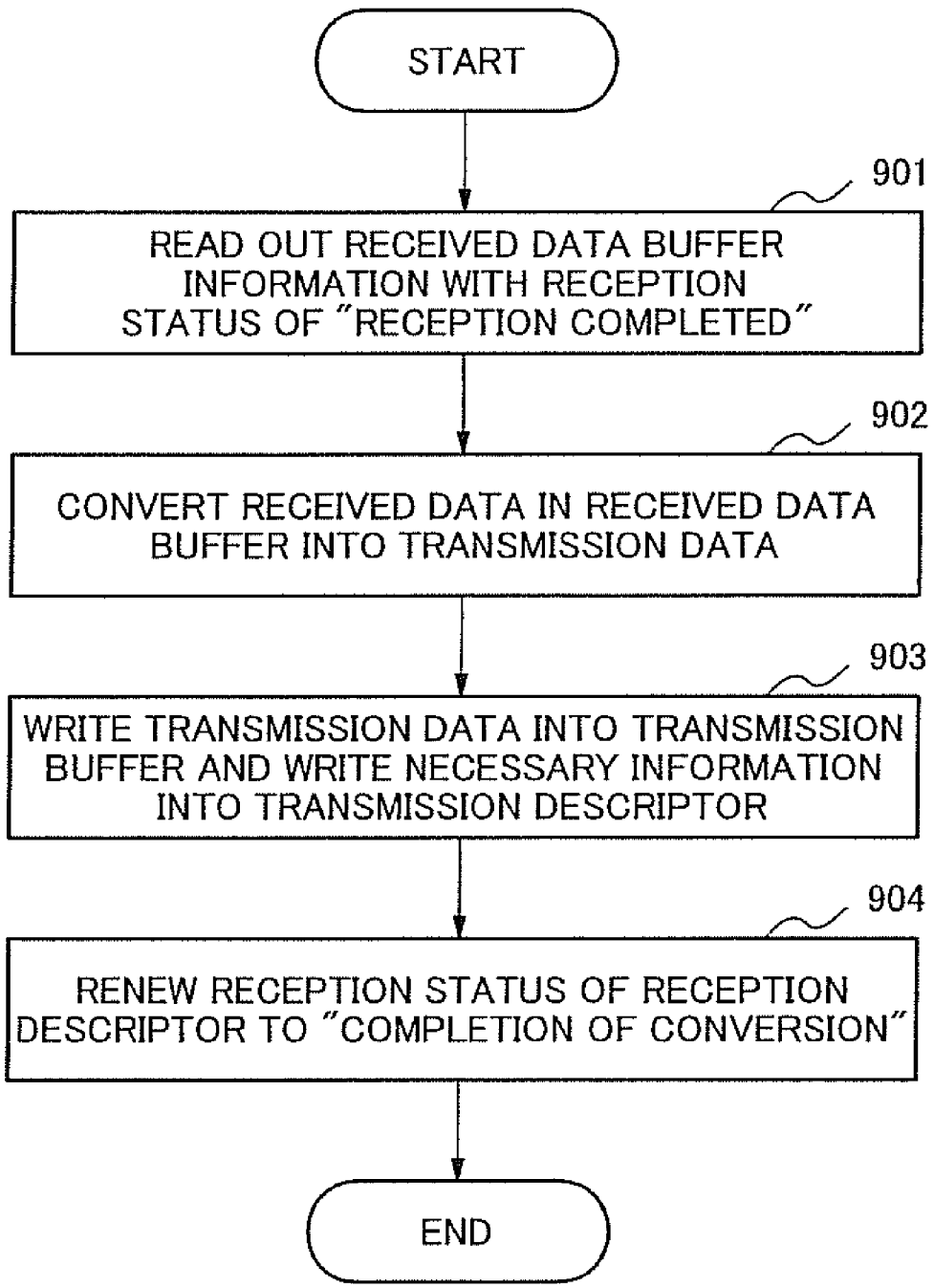
FIG. 9 is a flowchart illustrating a conversion process shown in FIG. 8 which converts the received data into the transmission data.

FIG. 9 is a flowchart illustrating the conversion process shown in FIG. 8 which converts the received data into transmission data. In other words, FIG. 9 is a flowchart showing the contents of processes in steps 802, 804, 806 and 808 shown in FIG. 8.

When recognizing the received data buffer information with the reception status 163 of "reception completed", the CPU 121 reads out the corresponding received data buffer address 164 and the received data length 165 (Step 901), and reads out the received data from the received data buffer 167 of FIG. 4. Then, the read received data is formatted into the format corresponding to the transmission side interface to generate the transmission data (Step 902). The generated transmission data is written in the transmission buffer 177 of FIG. 5, and the transmission buffer information is written in the transmission descriptor 171 (Step 903). When the above mentioned processes are completed, the corresponding reception status 163 of the reception descriptor 161 is renewed to "completion of conversion" (Step 904).

Thus, the conversion process for converting the received data into the transmission data is performed with respect to the received data buffer 167 corresponding to the information stored in the reception descriptor 161 in order of priority, the transmission data is stored in the transmission buffer 177, and the transmission buffer information is stored in the transmission descriptor 171 in order. Therefore, since the transmission buffer information is stored in the transmission descriptor 171 in order of priority of the transmission data, if the wired LAN controller 125 searches the transmission descriptor in order and performs a transmitting process of the transmission data, the transmission process can be performed according to the priority that is given to a parameter corresponding to the received data.

The LAN transmission data obtained by the conversion is transmitted to the wired LAN interface 112 by a transmission process of the wired LAN controller 125. A conversion process for a wireless LAN is performed by the CPU 121 with respect to the received data stored in the copied data buffer 217 of the RAM 123. The wireless transmission data after the conversion is transmitted to the wireless unit 124 by a transmission process of the CPU 121.

Further, in the above description, although one transmission descriptor 171 is used, a plurality of transmission descriptors may be arranged according to priority and a transmission process is performed according to priority at the time of the transmission process of the wired LAN controller 125.

In the above description, it is assumed that the priority has no direct relationship with the first to the fourth wired terminals $103_1$ to $103_4$ shown in FIGS. 1 to 3. However, the priority can be associated with the wired terminals. For example, a plurality of transmission descriptors are arranged according to the priority and the transmission descriptors are associated with each priority of the first to the fourth wired terminals

103₁ to 103₄. The priority that is set to the parameter of the parameter table 207 shown in FIG. 6 may be set as the priority according to the destination of the received data (the first to the fourth wired terminals 103₁ to 103₄). By such a manner, a read-out process of the received data is performed in the reception descriptor 161 corresponding to the priority, and the transmission data after the conversion is stored in the transmission descriptor corresponding to the priority. As a result, the transmission process according to the priority is performed.

Although the priority is not considered with respect to wireless data transmitted by the wireless unit 124, it is possible to consider it at the time of transmission similarly. For example, it is effective to transmit the received data with a real time behavior by high priority.

Figure 10:
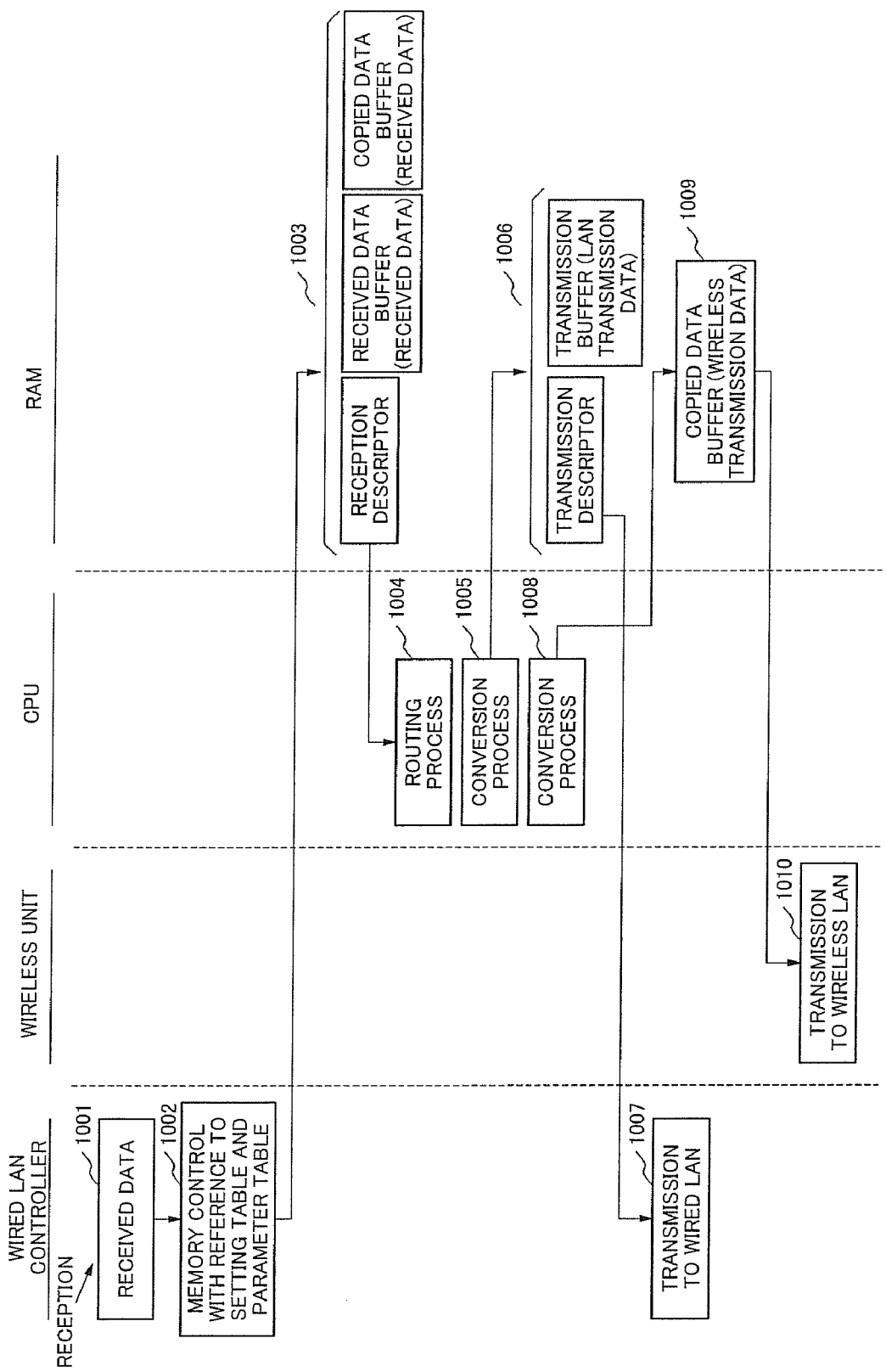
FIG. 10 is a sequence diagram illustrating a process of the received data performed by the router of the exemplary embodiment of the present invention.

On the other hand, the above mentioned process is described with reference to FIG. 10. FIG. 10 is a sequence diagram illustrating a process of the received data performed by the router of the exemplary embodiment of the present invention.

The wired LAN controller 125 compares the contents of the received data (Step 1001) with the information set in a setting table and extracts the parameter information required for memory control by referring to the corresponding parameter table (Step 1002). A DMA circuit of the wired LAN controller 125 sets the received data in the RAM 123 (a reception descriptor and a received data buffer) based on the extracted parameter information (Step 1003). Then, if information about data copy is included in the parameter information, the DMA circuit performs a process for copying the received data into the RAM 123 (a copied data buffer).

The received data set in the received data buffer and the copied data buffer of the RAM 123 is referred to by the CPU 121, and successive processes are performed. That is, the CPU 121 performs a routing process by referring to the received data (Step 1004) and performs a transmission data conversion process for formatting the data into the format for the routing destination. The data to be transmitted to the wired LAN interface 112 is converted into LAN transmission data by a conversion process (Step 1005) and the generated LAN transmission data is stored in a transmission buffer. Relevant information about the transmission data is stored in the transmission descriptor (Step 1006). The transmission data is transmitted to the wired LAN interface 112 by a transmission process performed by the wired LAN controller 125 (Step 1007). The wireless transmission data to be transmitted to the wireless LAN interface 111 is generated by performing a conversion process (Step 1008) which converts the received data set in the copied data buffer (Step 1009). The transmission data is transmitted to the wireless LAN interface 111 via the wireless unit 124 by a transmission process performed by the CPU (Step 1010).

In the exemplary embodiment described above, since copying the received data 203 is performed by the DMA controller 213, the process can be performed without involvement of the CPU 121. Accordingly, in a situation when a program hits an instruction cache, the CPU 121 can perform other process during the copy process which the CPU 121 no longer involves. Therefore, the router 101 can improve processing capacity. That is, in the related art shown in FIG. 11, since the copy process is performed by the CPU 121, three times of memory accesses occur, that are (1) a memory write for storing the received data, (2) reading out of the received data for copying, and (3) writing of the copied data. However, in the exemplary embodiment, (1) a memory write for storing the received data 201 and then (2) writing of the copied data can be performed sequentially. Accordingly, a read-out process of the received data 203 for copying can be omitted, and also since the time required for copying can be reduced, it contributes to performance improvement of the router 101. Since the number of accesses to a memory such as the RAM 123 decrease, an access waiting time for accessing the memory from the CPU 121 is shortened. It also contributes to performance improvement.

In particular, in a data processing system using a router as shown in the exemplary embodiment, the wireless LAN conforms to IEEE802.11 and the wired LAN conforms to IEEE802.3. That is, both standards to be referred to are different from each other. For this reason, frame formats to be used are different from each other. Therefore, when being transmitted to both of the wireless LAN and the wired LAN, the data has to be formatted into two frame formats that are different from each other. For example, when the data received from the WAN is transmitted to the wired LAN and the wireless LAN, an address conversion of the received data is performed by using, for example NAT (Network Address Translation) with respect to the data transmitted to the wired LAN, and the data is transmitted. The frame format of the data conforms to the Ethernet (registered trademark) (DIXII). On the other hand, with respect to the data transmitted to the wireless LAN, an address conversion of the received data is performed similarly and then the data has to be formatted into the frame format conforming to IEEE802.11.

In order to satisfy the necessary conditions, it is required to copy the received data, convert the copied data into the data for wired LAN and the data for wireless LAN, and transmit the converted data. In the related art, memory-to-memory copy is performed by a software process for copying the received data. When performing the memory-to-memory copy, the CPU only repeats a memory read operation and a write operation, and cannot perform other process. Thus, the processing capacity of the CPU is largely reduced. In the exemplary embodiment, since the processes are performed by DMA transfer, load on the CPU in the router is substantially reduced.

Moreover, in the exemplary embodiment, although the packet transfer from the WAN to the wired LAN and the wireless LAN is described, the present invention can be similarly applied to the transfer from the wired LAN to the WAN and the wireless LAN, and the transfer from the wireless LAN to the wired LAN and the WAN. In the description of the exemplary embodiment, the wired LAN controller 125 which handles data on the Ethernet (registered trademark) and the CPU 121 are independent from each other in the router 101. However, the both can be integrated as one apparatus.

In the description of the exemplary embodiment, the CPU performs a routing process. However, the present invention can also be applied to a case in which the wired LAN controller 125 includes a routing function provided by hardware or a case in which a routing function is realized by using an auxiliary processor such as a DSP (Digital Signal Processor). Moreover, in the exemplary embodiment, the setting table 205 and the parameter table 207 are arranged in the wired LAN controller 125 as a register group. However, the tables can be arranged in the memory such as the RAM 123.

In the description of the exemplary embodiment, all the processes from copying process to transmission process for the received data 203 are performed by hardware. However, it is possible to perform at least part of the processes by software.

While this invention has been particularly shown and described with reference to the exemplary embodiment thereof, the invention is not limited to the specific embodiment. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A data processing apparatus having capability of copying data received from a Wide Area Network (WAN) side interface port for transmitting the received data to both of destinations of a wired Local Area Network (LAN) interface port and a wireless LAN interface port, comprising:

a wired LAN controller which receives the data from the WAN side interface port, discriminates whether it is necessary to transmit the received data to both of destinations of the wired LAN interface port and the wireless LAN interface port based on header information of the received data, writes the received data into a received data buffer, and copies the received data and writes the copied data into a copied data buffer when it is necessary to transmit the received data to the wireless LAN interface port as well as the wired LAN interface port, wherein the wired LAN controller includes:

a reception FIFO memory which temporarily stores received data sequentially, parameter table means for storing parameters relating to priority information of the received data and copy requirement information for the received data corresponding to each header information of the received data, wherein the copy requirement information is included when the destination of the received data is both of the wired LAN interface port and the wireless LAN interface port, a comparator for comparing the header information of the received data read from the reception FIFO memory and extracting the parameters set in the parameter table means, a buffer management unit for receiving the parameters extracted from the parameter table means, searching a write address of a received data buffer for the received data based on the priority information and outputting the write address of the received data buffer, searching a write address of a copied data buffer and outputting the write address of the copied data buffer when the copy requirement information is included in the parameters, and Direct Memory Access (DMA) control means for receiving the write address of the received data buffer and writing the received data read from the reception FIFO memory into the write address of the received data buffer, and when the write address of the copied data buffer is also received, copying the received data and writing the copied data into the write address of the copied data buffer;

a Central Processing Unit (CPU) which converts each of formats of the received data written in the received data buffer and the copied data written in the copied data buffer into respective formats of transmission data corresponding to each of the wired LAN interface and the wireless LAN interface, and transmits the transmission data of the wireless LAN interface format to the wireless LAN interface port; and an L2 switch which connects with a plurality of wired LAN interface ports, and switches a destination of the transmission data of the wired LAN interface format to each wired LAN interface port according to a learned Media Access Control (MAC) address.

2. The data processing apparatus according to claim 1, further comprising:

a reception descriptor divided into a plurality of storage areas in accordance with the priority information of said received data, each of said storage areas stores reception status information of said received data and received data buffer information including information on the write address of said received data buffer from which said received data being written and a length of the received data written into said received data buffer, wherein said DMA control means receives a write address of the storage area of the reception descriptor corresponding to the priority information of the received data in addition to the write address of the received data buffer, and writes the reception status information which indicates reception of the received data being completed and the received data buffer information of the received data, which has been written into the received data buffer by the DMA control means, into the storage area based on the write address of the storage area of the reception descriptor.

3. The data processing apparatus according to claim 2, further comprising:

a transmission descriptor which stores transmission status information of said transmission data and transmission buffer information including information on a read address of a transmission buffer and a length of the transmission data written into said transmission buffer, wherein said CPU reads said received data buffer information of the reception descriptor in order of higher priority, reads out the received data stored in the received data buffer based on the received data buffer information for converting the received data into the transmission data, and writes the transmission data in the transmission buffer with writing the transmission status information, which indicates the transmission data is ready to be transmitted, and the transmission buffer information, which includes the read address of the transmission buffer and the length of the transmission data stored in the transmission buffer, into said transmission descriptor sequentially.

4. A data transfer method of a data processing apparatus having capability of copying data received from a Wide Area Network (WAN) side interface port for transmitting the received data to both of destinations of a wired Local Area Network (LAN) interface port and a wireless LAN interface port, comprising:

a first step for receiving the data, at a wired LAN controller, from the WAN side interface port and discriminating whether it is necessary to transmit the received data to both of destinations of the wired LAN interface port and a wireless LAN interface port based on header information of the received data, wherein the first step includes, storing the received data sequentially in a reception FIFO memory, comparing header information of the received data read from the reception FIFO memory with parameter table means which store parameters relating to priority information of the received data and copy requirement information for the received data corresponding to each header information of the received data, wherein the copy requirement information is included in the parameters when the destination of the received data is both of the wired LAN interface port and the wireless LAN interface port, and obtaining the parameters corresponding to the header information of the received data read from the reception FIFO memory;

a second step for writing the received data, at the wired LAN controller, into a received data buffer, and copying the received data and writing the copied data into a copied data buffer when it is necessary to transmit the received data to the wireless LAN interface port as well as the wired LAN interface port, wherein the second step includes, searching a write address of the received data buffer for the received data based on the priority information and outputting the write address of the received data buffer, and searching a write address of the copied data buffer and outputting the write address of the copied data buffer when the copy requirement information is included in the parameters; and writing, at Direct Memory Access (DMA) control means, the received data read from the reception FIFO memory into the write address of the received data buffer, and copying the received data and writing the copied data into the write address of the copied data buffer when the write address of the copied data buffer is included in the parameters;

a third step for converting, at a Central Processing Unit (CPU), each of formats of the received data written in the received data buffer and the copied data written in the copied data buffer into respective formats of transmission data corresponding to each of the wired LAN interface and the wireless LAN interface, and transmitting the transmission data of the wireless LAN interface format to the wireless LAN interface port; and a fourth step for switching a destination of the transmission data of the wired LAN interface format, through an L2 switch which connects with a plurality of wired LAN interface ports, to each wired LAN interface port and switches according to a learned Media Access Control (MAC) address.

5. The method according to claim 4, wherein the writing step at the DMA control means further comprises:

writing reception status information, which indicates reception of the received data being completed, and received data buffer information of the received data, which has been written into the received data buffer, into a reception descriptor corresponding to the priority information of the received data, wherein the reception descriptor is provided with a plurality of storage areas in accordance with the priority information of the received data and each of the storage areas stores the reception status information of the received data and the received data buffer information which includes information on a write address of the received data buffer and a length of the received data written into the received data buffer.

6. The method according to claim 4, wherein the third step comprises:

reading the received data buffer information of the reception descriptor in order of higher priority and reading out the received data stored in the received data buffer based on the received data buffer information;

converting the received data read from the received data buffer into transmission data;

writing the transmission data into a transmission buffer; and writing transmission status information, which indicates the transmission data is ready to be transmitted, and transmission buffer information, which includes a read address of the transmission buffer and a length of the transmission data stored in the transmission buffer, into a transmission descriptor sequentially.

7. The method according to claim 6, wherein the fourth step comprises:

reading the transmission descriptor, at the wired LAN controller, and reading out the transmission data of the wired LAN interface format from the transmission buffer based on the transmission buffer information of the transmission descriptor; and transmitting the transmission data of the wired LAN interface format to the wired LAN interface port corresponding to the header information of the transmission data through the L2 switch.

* * * * *